SECURE COMMUNICATION LINE

Filed May 31, 1962

3 Sheets-Sheet 1

INVENTOR.
GEORGE C. BYRNE
BY John F. Rawley
ATTORNEY

June 2, 1964 G. C. BYRNE 3,135,951

SECURE COMMUNICATION LINE

Filed May 31, 1962 3 Sheets-Sheet 2

INVENTOR.
GEORGE C. BYRNE
BY
ATTORNEY

SECURE COMMUNICATION LINE

Filed May 31, 1962 3 Sheets-Sheet 3

INVENTOR.
GEORGE C. BYRNE
BY John F. Lawler
ATTORNEY 3,135,951
SECURE COMMUNICATION LINE
George C. Byrne, Mountain View, Calif., assignor to Sylvania Electric Products Inc., a corporation of Delaware
Filed May 31, 1962, Ser. No. 199,008
5 Claims. (Cl. 340—276)

Figure 1:
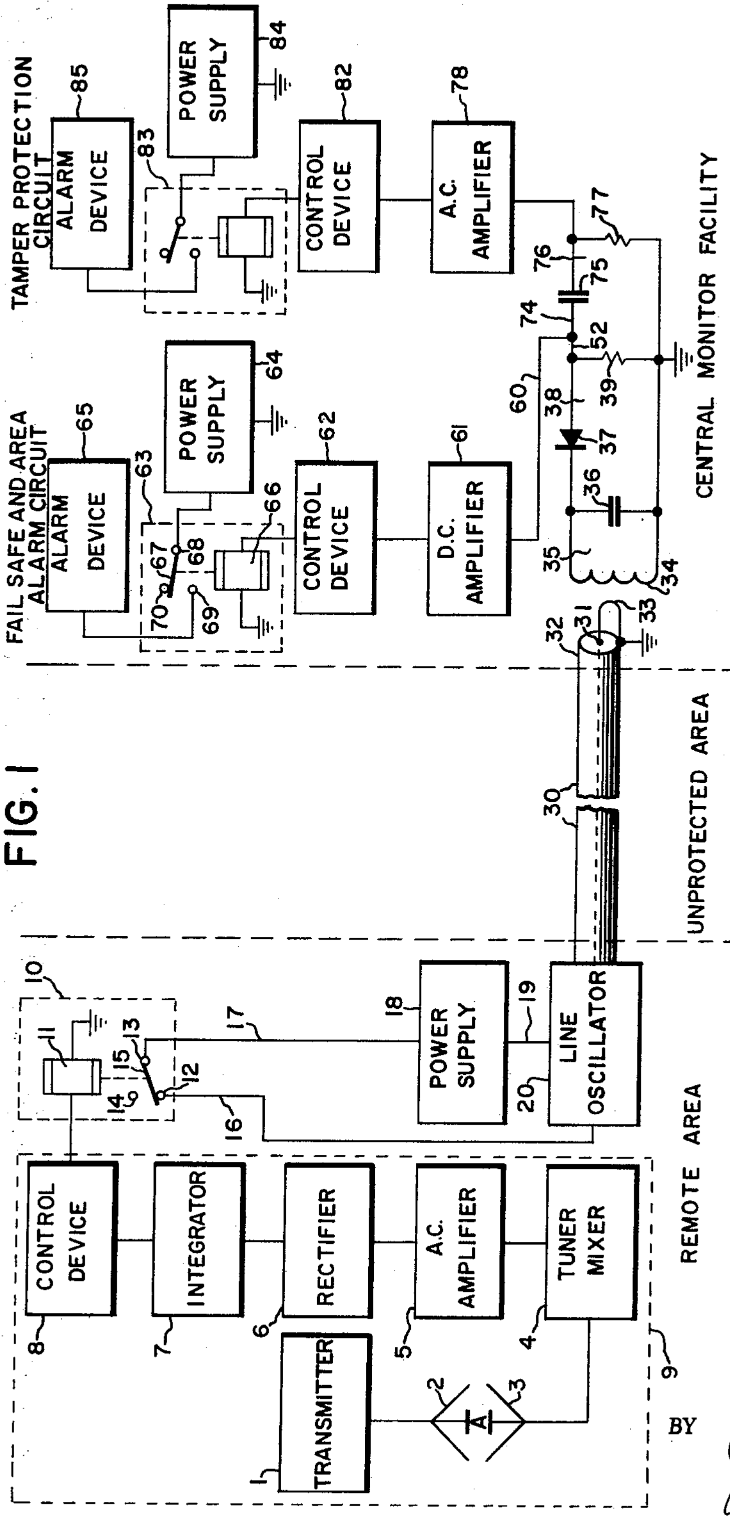

This invention relates to tamper protection systems for intrusion detection apparatus, and more particularly to a system for protecting against compromise the data transmission system between one or more remote protected areas and a central monitor facility.

Certain applications of anti-intrusion equipment require transmission of information related to the alarm status of such equipment over areas that are not in themselves regarded as secure. Protection of more than one remote area may also be required and alarms generated by several anti-intrusion detectors of such a system would be sent over a common transmission line to the central station located some distance away. Under these conditions, it is highly desirable that an intruder be prevented from defeating the security measures by tampering with the alarm transmission lines or by jamming the alarm transmission system, and that there be means provided to indicate at the central station which of the protected areas is under attack, and whether the transmission line is also under attack.

Various techniques for securing a transmission line have been proposed but all have the shortcoming that they may be defeated through connection of a comprising network to the line. The output of such a network simulates a safe condition on the line and renders the system insensitive to an "intrusion" of the protected area.

A primary object of this invention is the provision of a secure alarm transmission system capable of generating an alarm signal when an intruder tampers with the transmission line between the remote protected area and the central monitor facility.

Another object is the provision of a transmission line protection system which provides for the transmission of a number of alarm signals from several remote areas over a single transmission line.

In accordance with this invention, the output of an RF oscillator, located in the remote protected area, is fed to a transmission line running from the protected area to the central monitor facility. Energization of the oscillator is controlled by an alarm relay such that the oscillator is de-energized when an intrusion of the protected area occurs. During normal non-alarm operation the oscillator impresses a signal on the transmission line and that signal is coupled through a resonant circuit and is detected in the central monitor facility. The output of this detector, if below a predetermined level, activates an alarm circuit to indicate either an equipment failure or an intrusion of the secured area. The detector output is also coupled to a second circuit where it is differentiated to cause an alarm to be generated if the change in the output of the detector exceeds a preset level, such as might be caused by attaching a compromising network to the transmission line between the protected area and the central monitor facility. While it may be possible to separate the shielding on the transmission line without detection, the act of attaching a sampling device to the line to monitor the transmitted signal to determine its characteristics results in an abrupt change in the loading on the line. This change is detected at the central monitor facility and causes an alarm to be generated.

A modified form of the invention provides for continuous protection of the transmission line at all times, even during the interval when the system is alarmed.

Another modified form of the invention provides for the simultaneous transmission of alarm signals from several remote areas on a common transmission line that is protected at all times, as will be explained more fully forthwith.

Figure 1B:
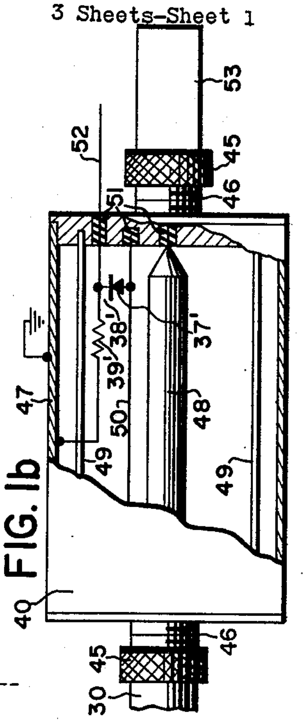
Figure 1A:
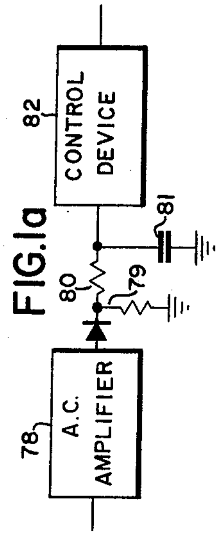
Figure 2:
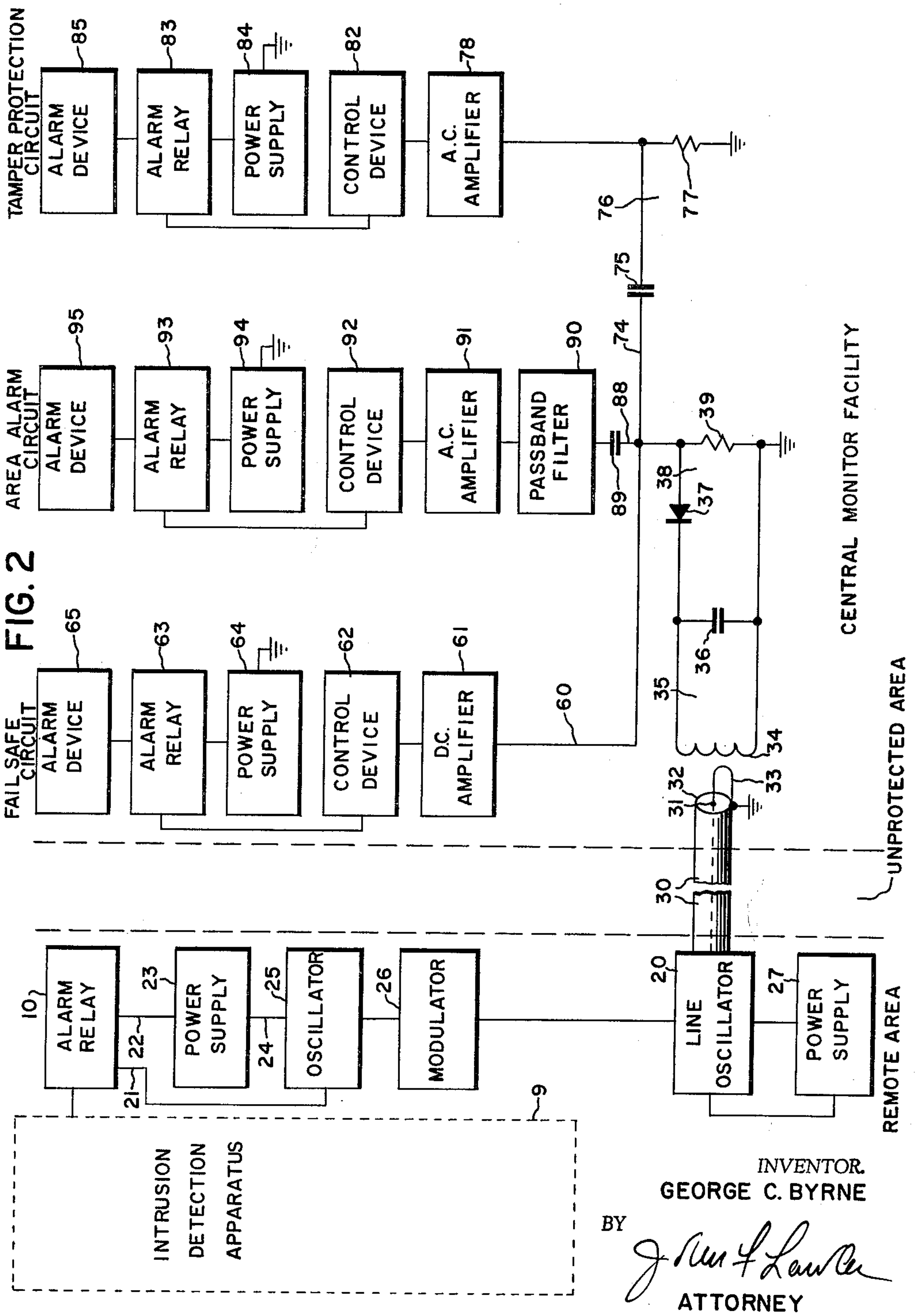
Figure 3:
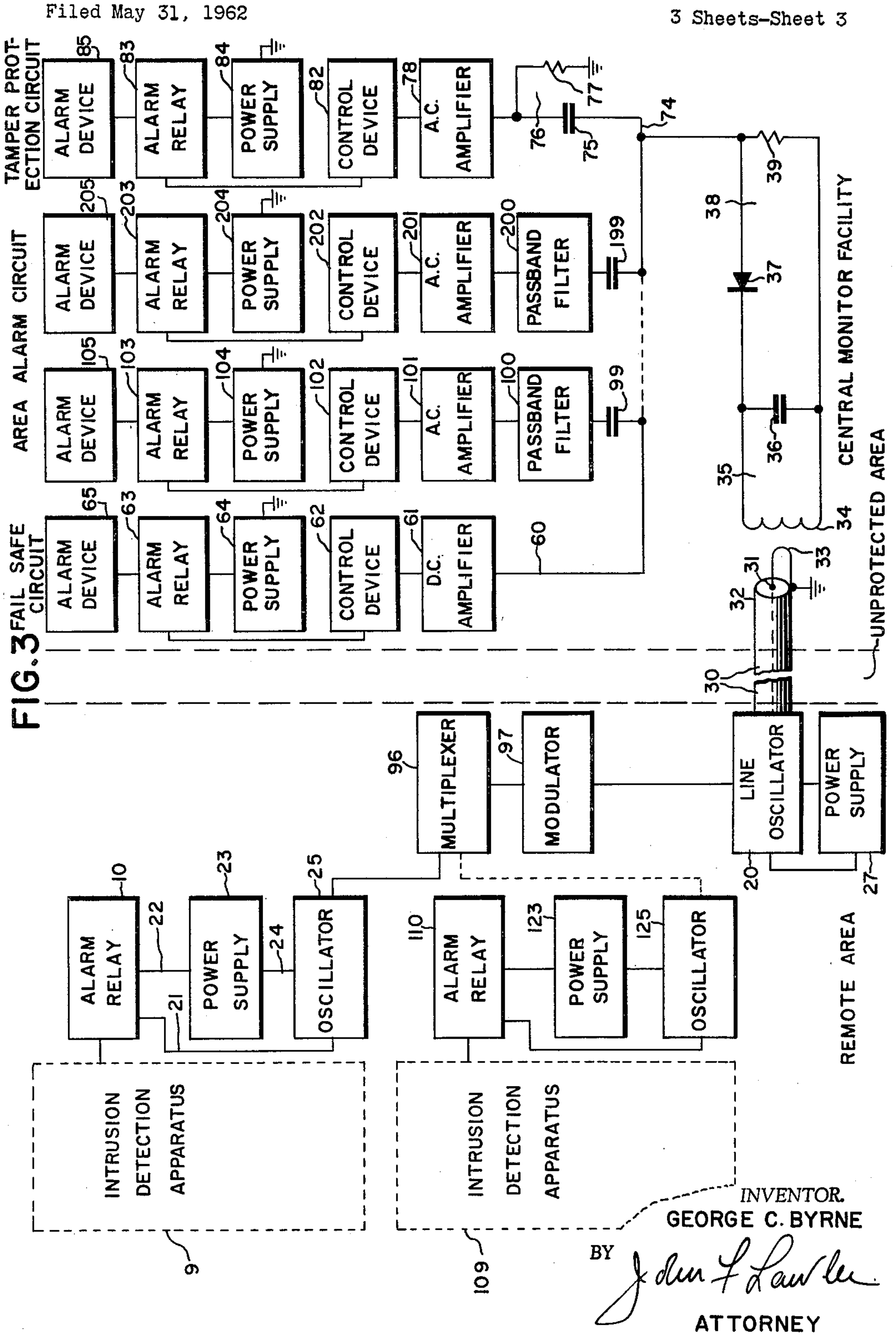

The foregoing and other objects and the operation of this invention will best be understood from the following description of embodiments thereof, reference being had to the accompanying drawings in which:

FIGURE 1 is a circuit and block diagram of an intrusion alarm system embodying the invention;

FIGURE 1*a* is a modified part of the tamper protection circuit showing a circuit to integrate variations in the output of the differentiator;

FIGURE 1*b* is a side view, partially broken away, of another form of coupling and detection circuit;

FIGURE 2 is a block and circuit diagram of another form of the invention providing protection of the transmission line when the intruder detection apparatus is alarmed; and FIGURE 3 is a block diagram of a modification of the embodiment of FIGURE 2 providing for protection of the transmission line carrying an alarm signal from intruder detection apparatus located in several remote areas.

Referring now to FIGURE 1, intrusion detection equipment 9 located in the area to be protected comprises a continuous wave radio frequency transmitter 1 connected to antenna 2 which beams radio frequency energy across the protected area A to receiving antenna 3 connected to tuner-mixer 4. Movement of an object in the area A produces a Doppler shift in the frequency of the received signal passed by tuner-mixer 4 to A.C. amplifier 5. The amplified Doppler signal is detected by rectifier 6 and summed by integrator 7. The output of integrator 7 controls the conduction state of control device 8 which normally conducts through and energizes alarm relay 10 when the system is in the non-alarm state.

Alarm relay 10 comprises a relay coil 11, contacts 12, 13 and 14, and contact arm 15. Contact 12 is connected by line 16 to line oscillator 20 and contact 13 is connected by line 17 and power supply 18 and line 19 to the second input terminal of line oscillator 20.

Line oscillator 20 is connected to transmission line 30 and produces a standing wave on it. The operating frequency of the oscillator is sufficiently high, preferably in the VHF range, to provide many wavelengths of the signal on the length of transmission line between the protected area and the central monitor facility to facilitate accurate detection of a shift in the magnitude and phase of a voltage standing wave. Line oscillator 20 preferably is a self-excited oscillator in order that its center frequency purposely will drift and further complicate attempts of an intruder to duplicate the signal for the purpose of defeating the system.

During normal non-alarm operation control device 8 conducts through and energizes relay coil 11 which causes contact arm 15 to make electrical connection between contacts 12 and 13 to connect power supply 18 to line oscillator 20 and energize the latter. The output of the line oscillator is transmitted over transmission line 30 to a central monitor facility and indicates that the remote area is secure as long as the signal from the line oscillator is present on the transmission line.

If the Doppler signal developed by an intruder is present for a sufficient time during a predetermined interval the charge stored by integrator 7 exceeds a prescribed level and cuts off normally conducting control device 8 which in turn de-energizes relay coil 11. Contact arm 15 then drops out and disconnects oscillator 20 from power supply 18. This removes the signal from transmission line 30 and triggers an alarm in the central monitor facility.

Line oscillator 20 is located in the protected area and transmission line 30 connects this area with the central monitor facility. Line 30 preferably is a coaxial line having a center conductor 31 which is connected in the central monitor facility through coupling loop 33 to outer conductor 32 and ground. The signal or voltage standing wave on line 30 is coupled through coupling loop 33 to parallel resonant tuned circuit 35 having an inductor 34 and a capacitor 36, and is detected by detector 38 comprising diode 37 and load resistor 39. The output of detector 38 is fed simultaneously through line 60 to a fail-safe and area alarm circuit and through line 74 to a tamper protection circuit.

The fail-safe and area alarm circuit comprises a D.C. amplifier 61, a control device 62 which is conducting in the non-alarm state, an alarm relay 63, a power supply 64, and an alarm device 65. Alarm relay 63 comprises relay coil 66, movable arm 67, and a stationary contact 69 which arm 67 engages and disengages when coil 66 is de-energized and energized, respectively. When coil 66 is de-energized, arm 67 completes the circuit between contacts 68 and 69 and connects power supply 64 to alarm device 65, which may be a light or bell, for example, to activate the latter.

The tamper protection circuit comprises a differentiator 76 having a capacitor 75 and a resistor 77, an A.C. amplifier 78, a normally conducting (non-alarm state) control device 82, an alarm relay 83, a power supply 84, and an alarm device 85. The trigger device, alarm relay, power supply, and alarm device of the fail-safe and area alarm circuit and the tamper protection circuit, respectively, are identical in structure and operation.

When the system is in the non-alarm state, the oscillator signal is carried by line 30 to the central monitor facility, is coupled out by loop 33 and tuned circuit 35 and appears at the output of detector 38 as a relatively constant D.C. potential that is amplified by D.C. amplifier 61 and is fed to normally conducting control device 62. As long as this D.C. potential is greater than a preset level, control device 62 conducts through relay coil 66 and holds arm 67 out of engagement with contact 69 so that power supply 64 is disconnected from alarm device 65.

When an intrusion of the secured area is detected, line oscillator 20 ceases operating and the D.C. output of detector 38 falls to zero. Control device 62 is then cut off, alarm relay 63 is de-energized, and contact arm 67 engages contact 69 and power to device 65 causes an alarm to be given.

Differentiator 76 differentiates the output of detector 38 and produces an output pulse in response to an abrupt change in the D.C. output of detector 38. This output pulse is amplified by A.C. amplifier 78 which controls the operation of control device 82. Control devices 82 and 62, alarm relays 83 and 63, and alarm devices 85 and 65, respectively, operate in a similar manner except that control device 82 is normally conducting and is cut off in response to a positive or negative going input that exceeds a preset level. Tampering with the transmission line or intrusion of the secured area is indicated if the magnitude of the output of A.C. amplifier 78 or D.C. amplifier 61 exceeds a preset level.

One technique an intruder may employ in an attempt to compromise the system is attachment of a "safe" signal generator to the transmission line 30 between the remote area and the central monitor facility to simulate a "safe" condition at the remote area so that the latter may be entered without detection. To do this, the intruder must first identify and duplicate the system's operating mode including the signal on the transmission line. Signal identification requires a sampling of the signal on the transmission line. In order to get to the center conductor of the transmission line, it is necessary to separate the shielding on the line. It is extremely difficult to do this without loading the transmission line and changing the match. Assuming the intrdder is successful in separating the shielding, when a coupling loop is moved sufficiently close to the center conductor to sample the signal an abrupt change in the loading at that point will occur. This causes a rapid change in the magnitude and phase of the voltage standing wave on the line which is coupled through loop 33 and tuned circuit 35 and appears as an abrupt change in the level of the D.C. output of detector 38. This change is not sufficient to cut off control device 62, but is differentiated by differentiator 76 to produce an output pulse that is amplified by A.C. amplifier 78 to cut off control device 82 and activate alarm device 85 as described in the operation analysis of the fail-safe and area alarm circuit of FIGURE 1.

FIGURE 1*a* illustrates a modification of the aforementioned embodiment whereby a diode rectifier 79 and an integrator circuit comprising resistor 80 and capacitor 81, is inserted between the A.C. amplifier 78 and control device 82. The time constant of the integrator is adjusted such that the output of differentiator 76, indicating a change in the standing wave on the transmission line, will be summed over a predetermined time interval to indicate a tampering with the transmission line.

A coaxial cavity assembly 40, see FIGURE 1*b*, may be used in place of coupling loop 33, tuned circuit 35 and detector 38 (FIGURE 1) for coupling from and detecting the signals on transmission line 30. The assembly 40 is connected to line 30 by standard connector 45 and comprises a cylindrical outer conductor 47 and a coaxial inner conductor 48, both having diameters substantially greater than the corresponding conductors of line 30. Assembly 40 and its associated components are similar to a reflectometer except that only one detector unit is employed. Insulator rods 49 reinforce the assembly. A single wire 50, coextensive with and proximate to inner conductor 48 and terminated in insulators 51 on the assembly end walls, serves to couple signals from the cavity. These signals are detected by detector 38′ comprised of diode 37′ and resistor 39′ and are transmitted out of the cavity on line 52 for connection to lines 60 and 74, see FIGURE 1. A load 53 is connected to the output of the cavity.

It will be noted that the above described system does not provide line tamper protection during the interval when oscillator 18 is cut off due to an intrusion of the secured remote area. In installations where transmission line 30 is plainly visible to the guard during his inspection of the secured area to investigate the cause of the alarm, no additional protection of line 30 is required. However, in other applications the line 30 may not be visible during this inspection, and therefore the line is unprotected and vulnerable during the interval after the intrusion alarm is triggered and before it is reset. In order to protect line 30 at all times a modified system shown in FIGURE 2 is provided. Since the circuits of FIGURES 1 and 2 are similar in many respects like reference characters are used to indicate like parts or components in the drawings.

In the embodiment of FIGURE 2, power supply 23 is connected to a secondary oscillator 25, located in the remote area, through line 24 and through alarm relay 10 and line 21. The output of secondary oscillator 25 is fed to modulator 26 which modulates line oscillator 20. Line oscillator 20 is connected directly to power supply 27 and transmits a signal, which is either modulated (when the protected area is secure) or unmodulated (when an intrusion of the protected area is detected), on transmission line 30 at all times.

Secondary oscillator 25 is operative during normal non-alarm operation, its conduction state being controlled by the position of he contact arm of alarm relay 10 as described in relation to the operation of the embodiment of FIGURE 1. When an intrusion of the secured area is detected alarm relay 10 becomes de-energized and disconnects power supply 23 from the oscillator. This removes the modulation from the output of line oscillator 20 and an intrusion of the protected area is indicated in the central monitor facility as will be explained more fully below.

The output of line oscillator 20 is transmitted on line 30 to the central monitor facility and coupled through coupling loop 33 and tuned circuit 35 to detector 38. The output of detector 38, a signal having a D.C. component and a frequency equal to that of secondary oscillator 25, is fed simultaneously through line 60 to a fail-safe circuit, through line 74 to a tamper protection circuit, and through line 88 to an area alarm circuit.

The fail-safe circuit connected to line 60 is identical in structure and operation to the fail-safe and area alarm circuit of FIGURE 1 and indicates a system failure when the D.C. potential is removed from the circuit.

The tamper protection circuit connected to line 74 is identical in structure and operation to the tamper protection circuit of FIGURE 1.

The area alarm circuit connected to line 88 consists of coupling capacitor 89 and pass band filter 90 which pass only signals with a frequency equal to that of secondary oscillator 25 or within the range of frequencies over which the oscillator drifts. The signal passed by filter 90 is amplified by A.C. amplifier 91 and fed to normally conducting (non-alarm state) control device 92 to maintain the control device in the cut-off state. If the output of secondary oscillator 25 does not appear in the output of detector 38, a condition that occurs when there has been an intrusion of the secured area, the output of A.C. amplifier 91 reaches the cut-off level and cuts off control device 92, alarm relay 93 is de-energized and alarm device 95 is activated to indicate an intrusion of the protected area as described in the operation of the fail-safe and area alarm circuit of FIGURE 1.

The detection system shown in FIGURE 3 comprises several intruder detection devices located in different remote areas. Although two intrusion detection devices and remote areas are shown in FIGURE 3 for illustrative purposes the application of this invention is not limited to the protection of two remote areas. The outputs of the several devices are combined and transmitted over a common cable to a central monitor facility for surveillance. Each device at any one remote area is similar in structure and operation to that shown in FIGURE 2 except that the outputs of the several oscillators 25 shown in FIGURE 3, each oscillator 25 operating in a particular frequency band and preferably an audio oscillator, are combined by a multiplexer 96 and are fed to modulator 97 which modulates line oscillator 20. Multiplexer 96, modulator 97, and oscillator 20 are located in one of the remote areas.

The modulated output of line oscillator 20 is transmitted at all times on transmission line 30 to the central monitor facility where it is detected by detector 38. The signal on line 30 has components that are the frequency of the oscillators 25 located in the remote areas except when an intrusion of a secured area is detected and a particular oscillator 25 is rendered inoperative. The output of detector 38, having a D.C. value and containing components whose frequency is that of line oscillator 20 and each operative oscillator 25, is simultaneously fed to a fail-safe circuit, a tamper protection circuit, and an area alarm circuit. The structure and operation of the fail-safe circuit and tamper protection circuit are identical to corresponding circuits described above in conjunction with FIGURE 2.

An area alarm circuit is provided for each protected area and comprises coupling capacitor 99, pass band filter 100 (adjusted to pass only the output of a particular oscillator 25), A.C. amplifier 101, control device 102, alarm relay 103, and alarm device 105. The operation of each area alarm circuit is substantially the same as that of the area alarm circuit of FIGURE 2.

I claim:

1. In combination, an intrusion detection system and a secure transmission line tamper protection system comprising
   - alarm relay means responsive to the output of said detection system,
   - first oscillator means energized through said alarm relay means when said detection system is not alarmed,
   - second energized oscillator means modulated by said first oscillator means,
   - conductor means connected between said second oscillator means and a monitor facility,
   - detector means electrically connected to said conductor means in said monitor facility to demodulate the modulated output of said second oscillator means on said conductor means,
   - first indicator means connected to said detector means and responsive to the output thereof less than a predetermined magnitude to indicate de-energization of said second oscillator means and system failure,
   - differentiator means electrically connected to said detector means to differentiate the output thereof,
   - second indicator means connected to said differentiator means and responsive to the output thereof in excess of a predetermined magnitude to indicate tampering with said conductor means, and
   - third indicator means connected to said detector means and responsive to the absence of the output of said first oscillator means in the demodulation output of said detector means to indicate inoperativeness of said first oscillator means and intrusion of the protected area.

2. In combination, an intrusion detection system and a tamper protection system as claimed in claim 1 in which an intrusion detection system, alarm relay means and first oscillator means are located in each of a plurality of protected areas, including means to multiplex the outputs of said first oscillator means to modulate said second energized oscillator means, and including a plurality of third indicator means connected to said detector means, each indicator means being responsive to the absence of a first oscillator means output in the demodulated output of said detector means to indicate inoperativeness of a first oscillator means and an intrusion of a protected area.

3. In combination, an intrusion detection system and a tamper protection system as claimed in claim 2 in which said first indicator means comprises
   - D.C. amplifier means,
   - control means responsive to the output of said D.C. amplifier means, and
   - alarm means responsive to the conduction state of said control means to indicate inoperativeness of said second energized oscillator means and system failure.

4. In combination, an intrusion detection system and a tamper protection system as claimed in claim 3 in which said second indicator means comprises:
   - A.C. amplifier means,
   - control means responsive to the output of said A.C. amplifier means, and
   - alarm means responsive to the conduction state of said control means to indicate tampering with said conductor means.

5. In combination, an intrusion detection system and a tamper protection system as claimed in claim 3 in which said third indicator means comprises
   - coupling means, means connected to said coupling means to pass a particular frequency band, A.C. amplifier means responsive to said bandpass means for amplifying signals in said particular frequency band, control means responsive to the output of said A.C. amplifier means, and alarm means responsive to the conduction state of said control means to indicate inoperativeness of a particular first oscillator means and intrusion of a particular protected area.

References Cited in the file of this patent

UNITED STATES PATENTS

| | | |
|---|---|---|
| 2,428,290 | Peck | Sept. 30, 1947 |
| 2,496,259 | Bachman | Feb. 7, 1950 |
| 2,854,570 | Boverman | Sept. 30, 1958 |
| 2,907,017 | Cowen | Sept. 29, 1959 |
| 2,971,184 | Pearson et al. | Feb. 7, 1961 |
| 3,010,100 | Muehter | Nov. 21, 1961 |

FOREIGN PATENTS

| | | |
|---|---|---|
| 704,779 | England | Mar. 3, 1954 |